(12) United States Patent
Kray et al.

(10) Patent No.: US 12,104,501 B2
(45) Date of Patent: Oct. 1, 2024

(54) CANTILEVERED AIRFOILS AND METHODS OF FORMING THE SAME

(71) Applicant: General Electric Company, Schenectady, NY (US)

(72) Inventors: Nicholas J. Kray, West Chester, OH (US); Vidyashankar Buravalla, Bengaluru (IN)

(73) Assignee: General Electric Company, Evendale, OH (US)

(*) Notice: Subject to any disclaimer, the term of this patent is extended or adjusted under 35 U.S.C. 154(b) by 0 days.

(21) Appl. No.: 17/944,790

(22) Filed: Sep. 14, 2022

(65) Prior Publication Data

US 2023/0235674 A1 Jul. 27, 2023

(30) Foreign Application Priority Data

Jan. 26, 2022 (IN) .............................. 202211004353

(51) Int. Cl.
| | |
|---|---|
| *F01D 5/14* | (2006.01) |
| *F01D 5/18* | (2006.01) |
| *F01D 17/08* | (2006.01) |
| *F01D 17/16* | (2006.01) |
| *F02C 7/04* | (2006.01) |
| *F02C 7/042* | (2006.01) |

(Continued)

(52) U.S. Cl.
CPC ............. *F01D 5/148* (2013.01); *F01D 5/18* (2013.01); *F01D 17/085* (2013.01); *F01D 17/162* (2013.01); *F02C 7/04* (2013.01); *F02C 7/042* (2013.01); *F02C 7/057* (2013.01); *F02K 3/06* (2013.01); *F04D 29/542* (2013.01); *F04D 29/563* (2013.01); *B64D 2033/0226* (2013.01); *F05D 2220/323* (2013.01); *F05D 2250/90* (2013.01); *F05D 2260/20* (2013.01); *F05D 2270/303* (2013.01); *F05D 2270/3032* (2013.01); *F05D 2300/505* (2013.01)

(58) Field of Classification Search
CPC .. F02C 7/04; F02C 7/042; F02C 7/057; F04D 29/542; F04D 29/563; F05D 2300/505; F01D 5/187; F01D 17/085; F01D 17/162
See application file for complete search history.

(56) References Cited

U.S. PATENT DOCUMENTS 3,038,698 A * 6/1962 Troyer .................... F01D 9/045
                                                        415/12
3,042,371 A * 7/1962 Fanti ..................... F04D 29/368
                                                        415/12

(Continued)

FOREIGN PATENT DOCUMENTS

| EP | 3214268 | 9/2017 |
| JP | 58093903 A * | 6/1983 |

*Primary Examiner* — Kyle Robert Thomas
(74) *Attorney, Agent, or Firm* — Hanley, Flight & Zimmerman, LLC (57) ABSTRACT

Cantilevered airfoils and methods of forming the same are disclosed herein. An example airfoil disclosed herein includes an airfoil including an airfoil body including a first face and a second face, a first recessed portion formed in the first face and internal temperature-regulating features and a first insert disposed within the first recessed portion, the first insert causing the airfoil body to assume a first predefined curvature profile at a first temperature, the first insert causing the airfoil body to assume a second predefined curvature profile at a second temperature.

18 Claims, 8 Drawing Sheets

(51) Int. Cl.
  *F02C 7/057* (2006.01)
  *F02K 3/06* (2006.01)
  *F04D 29/54* (2006.01)
  *F04D 29/56* (2006.01)
  *B64D 33/02* (2006.01)

(56) References Cited

U.S. PATENT DOCUMENTS

| | | |
|---|---|---|
| 6,468,032 B2 | 10/2002 | Patel |
| 7,384,240 B2 * | 6/2008 | McMillan ............... F01D 5/147 |
| | | 416/131 |
| 8,152,445 B2 * | 4/2012 | Guemmer ................. F01D 9/04 |
| | | 415/58.7 |
| 9,267,382 B2 | 2/2016 | Szwedowicz et al. |
| 10,196,898 B2 | 2/2019 | Kray et al. |
| 10,378,554 B2 | 8/2019 | Yu et al. |
| 10,662,803 B2 | 5/2020 | Mears |
| 10,711,797 B2 | 7/2020 | Kroger et al. |
| 10,794,396 B2 | 10/2020 | Kroger et al. |
| 10,815,886 B2 * | 10/2020 | Kroger .................. F04D 29/541 |
| 11,111,811 B2 | 9/2021 | Joly et al. |
| 2006/0018761 A1 * | 1/2006 | Webster ................. F01D 5/148 |
| | | 416/233 |
| 2010/0329851 A1 * | 12/2010 | Nilsson ................. F04D 29/023 |
| | | 415/151 |
| 2014/0060062 A1 * | 3/2014 | Subbareddyar ......... F01D 25/30 |
| | | 60/527 |
| 2016/0138419 A1 * | 5/2016 | Kray ........................ F01D 9/02 |
| | | 415/208.1 |
| 2020/0032655 A1 | 1/2020 | Prince et al. |

\* cited by examiner

CANTILEVERED AIRFOILS AND METHODS OF FORMING THE SAME

RELATED APPLICATION

This patent claims priority to Indian Provisional Patent Application No. 202211004353, filed on Jan. 26, 2022, and which is incorporated by reference herein in its entirety.

FIELD OF THE DISCLOSURE

This disclosure relates generally to gas turbines, and, more particularly, to cantilevered airfoils and methods of forming the same.

BACKGROUND

A gas turbine engine generally includes, in serial flow order, an inlet section, a compressor section, a combustion section, a turbine section, and an exhaust section. In operation, air enters the inlet section and flows to the compressor section where one or more axial compressors progressively compress the air until it reaches the combustion section, thereby creating combustion gases. The combustion gases flow from the combustion section through a hot gas path defined within the turbine section and then exit the turbine section via the exhaust section. A gas turbine engine produces a thrust that propels a vehicle forward, e.g., a passenger aircraft. The thrust from the engine transmits loads to a wing mount, e.g., a pylon, and, likewise, the vehicle applies equal and opposite reaction forces onto the wing via mounts.

BRIEF DESCRIPTION OF THE DRAWINGS

A full and enabling disclosure, including the best mode thereof, directed to one of ordinary skill in the art, is set forth in the specification, which makes reference to the appended Figures, in which.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, joined, detached, decoupled, disconnected, separated, etc.) are to be construed broadly and may include intermediate members between a collection of elements and relative movement between elements unless otherwise indicated. As used herein, the term "decouplable" refers to the capability of two parts to be attached, connected, and/or otherwise joined and then be detached, disconnected, and/or otherwise non-destructively separated from each other (e.g., by removing one or more fasteners, removing a connecting part, etc.). As such, connection/disconnection references do not necessarily infer that two elements are directly connected and in fixed relation to each other. Stating that any part is in "contact" with another part means that there is no intermediate part between the two parts.

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

In recent years, gas turbine engines have had higher internal rotational speeds. As the rotational speed of the engine increases, the tips of the largest blades in the engine (e.g., the fan blades, etc.) can approach supersonic speeds. The high speed of these components can make the incidence angle of the airflow onto these blades difficult to regulate. Examples disclosed herein include a cantilevered airfoil disposed upstream of the airfoils with variable curvature profiles. The example airfoils disclosed herein include shaped-metal alloys (SMA) that assume different shapes depending on the temperature of the airfoil. Based on the inlet conditions and engine speed, the shape of the example airfoils disclosed herein can be modified to change the angle of incidence of flow onto the fan blades, which improves the efficiency of the gas turbine engine. That is, the efficiency of the fan section of a gas turbine engine is partly based on the angle of incidence of the inlet flow on the first stage of the fan section. The example airfoils disclosed herein enable the control of the angle of incidence of the first stage of the fan section by changing shape. In some examples, the shape of the airfoils disclosed herein can be controlled based on engine condition (e.g., engine speed, aircraft speed, etc.), flow condition (e.g., direction, temperature, pressure, velocity, turbulence, etc.), and/or flight phase (e.g., takeoff, landing, cruise, idle, etc.). Examples disclosed herein are significantly lighter than conventional variable stators because they do not require an actuator system to change the position of the airfoil and do not extend over the entire length of the flow path.

The terms "upstream" and "downstream" refer to the relative direction with respect to fluid flow in a fluid pathway. For example, "upstream" refers to the direction from which the fluid flows, and "downstream" refers to the direction to which the fluid flows.

Various terms are used herein to describe the orientation of features. As used herein, the orientation of features, forces and moments are described with reference to the yaw axis, pitch axis, and roll axis of the vehicle associated with the features, forces and moments. In general, the attached figures are annotated with reference to the axial direction, radial direction, and circumferential direction of the gas turbine associated with the features, forces and moments. In general, the attached figures are annotated with a set of axes including the axial axis A, the radial axis R, and the circumferential axis C. As used herein, the terms "longitudinal," and "axial" are used interchangeably to refer to directions parallel to the axial axis. As used herein, the term "radial" is used to refer to directions parallel to the radial axis. As used herein, the term "circumferential" is used to refer to directions parallel to the circumferential axis.

In some examples used herein, the term "substantially" is used to describe a relationship between two parts that is within three degrees of the stated relationship (e.g., a substantially collinear relationship is within three degrees of being linear, a substantially perpendicular relationship is within three degrees of being perpendicular, a substantially parallel relationship is within three degrees of being parallel, etc.). As used herein, the term "linkage" refers to a connection between two parts that restrain the relative motion of the two parts (e.g., restrain at least one degree of freedom of the parts, etc.). "Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 1:
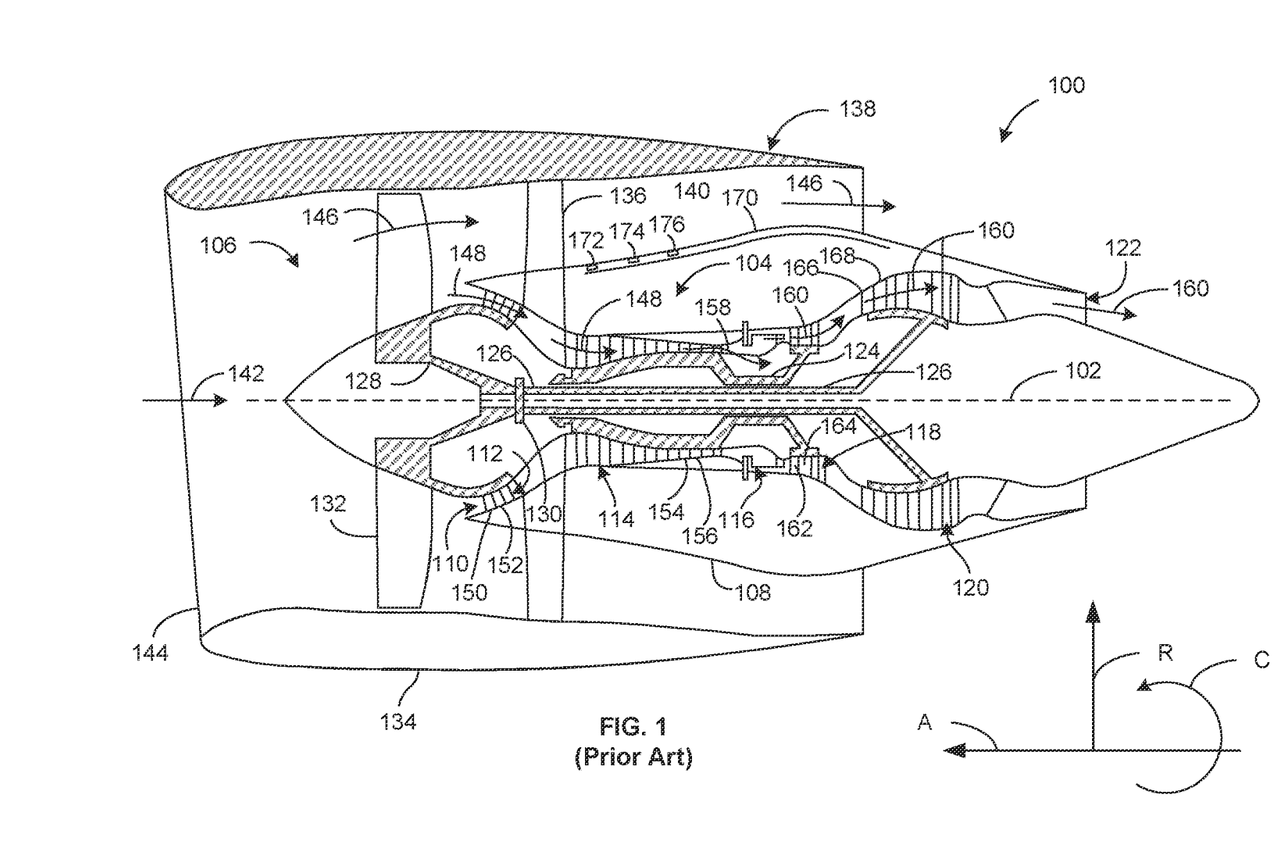
FIG. 1 illustrates a cross-sectional view of a prior gas turbine engine.

Referring now to the drawings, wherein identical numerals indicate the same elements throughout the figures, FIG. 1 is a schematic cross-sectional view of a prior art turbofan-type turbofan 100. As shown in FIG. 1, the turbofan 100 defines a longitudinal or axial centerline axis 102 extending therethrough for reference. In general, the turbofan 100 may include a core turbine 104 or gas turbine engine disposed downstream from a fan section 106.

The core turbine 104 generally includes a substantially tubular outer casing 108 ("turbine casing 108") that defines an annular inlet 110. The outer casing 108 can be formed from a single casing or multiple casings. The outer casing 108 encloses, in serial flow relationship, a compressor section having a booster or low pressure compressor 112 ("LP compressor 112") and a high pressure compressor 114 ("HP compressor 114"), a combustion section 116, a turbine section having a high pressure turbine 118 ("HP turbine 118") and a low pressure turbine 120 ("LP turbine 120"), and an exhaust section 122. A high pressure shaft or spool 124 ("HP shaft 124") drivingly couples the HP turbine 118 and the HP compressor 114. A low pressure shaft or spool 126 ("LP shaft 126") drivingly couples the LP turbine 120 and the LP compressor 112. The LP shaft 126 may also couple to a fan spool or shaft 128 of the fan section 106 ("fan shaft 128"). In some examples, the LP shaft 126 may couple directly to the fan shaft 128 (i.e., a direct-drive configuration). In alternative configurations, the LP shaft 126 may couple to the fan shaft 128 via a reduction gearbox 130 (e.g., an indirect-drive or geared-drive configuration).

As shown in FIG. 1, the fan section 106 includes a plurality of fan blades 132 coupled to and extending radially outwardly from the fan shaft 128. An annular fan casing or nacelle 134 circumferentially encloses the fan section 106 and/or at least a portion of the core turbine 104. The nacelle 134 is supported relative to the core turbine 104 by a plurality of circumferentially-spaced apart outlet guide vanes 136. Furthermore, a downstream section 138 of the nacelle 134 can enclose an outer portion of the core turbine 104 to define a bypass airflow passage 140 therebetween.

As illustrated in FIG. 1, air 142 enters an inlet portion 144 of the turbofan 100 during operation thereof. A first portion 146 of the air 142 flows into the bypass airflow passage 140, while a second portion 148 of the air 142 flows into the inlet 110 of the LP compressor 112. One or more sequential stages of LP compressor stator vanes 150 and LP compressor rotor blades 152 coupled to the LP shaft 126 progressively compress the second portion 148 of the air 142 flowing through the LP compressor 112 en route to the HP compressor 114. Next, one or more sequential stages of HP compressor stator vanes 154 and HP compressor rotor blades 156 coupled to the HP shaft 124 further compress the second portion 148 of the air 142 flowing through the HP compressor 114. This provides compressed air 158 to the combustion section 116 where it mixes with fuel and burns to provide combustion gases 160.

The combustion gases 160 flow through the HP turbine 118 in which one or more sequential stages of HP turbine stator vanes 162 and HP turbine rotor blades 164 coupled to the HP shaft 124 extract a first portion of kinetic and/or thermal energy from the combustion gases 160. This energy extraction supports operation of the HP compressor 114. The combustion gases 160 then flow through the LP turbine 120 where one or more sequential stages of LP turbine stator vanes 166 and LP turbine rotor blades 168 coupled to the LP shaft 126 extract a second portion of thermal and/or kinetic energy therefrom. This energy extraction causes the LP shaft 126 to rotate, thereby supporting operation of the LP compressor 112 and/or rotation of the fan shaft 128. The combustion gases 160 then exit the core turbine 104 through the exhaust section 122 thereof.

Along with the turbofan 100, the core turbine 104 serves a similar purpose and sees a similar environment in land-based gas turbines, turbojet engines in which the ratio of the first portion 146 of the air 142 to the second portion 148 of the air 142 is less than that of a turbofan, and unducted fan engines in which the fan section 106 is devoid of the nacelle 134. In each of the turbofan, turbojet, and unducted engines, a speed reduction device (e.g., the reduction gearbox 130) may be included between any shafts and spools. For example, the reduction gearbox 130 may be disposed between the LP shaft 126 and the fan shaft 128 of the fan section 106. FIG. 1 further includes a cowling 170 and offset-arch gimbals 172, 174, 176. The cowling 170 is a covering which may reduce drag and cool the engine. The offset-arch gimbals 172, 174, 176 may, for example, include infrared cameras to detect a thermal anomaly in the under-cowl area of the turbofan 100.

Figure 2A:
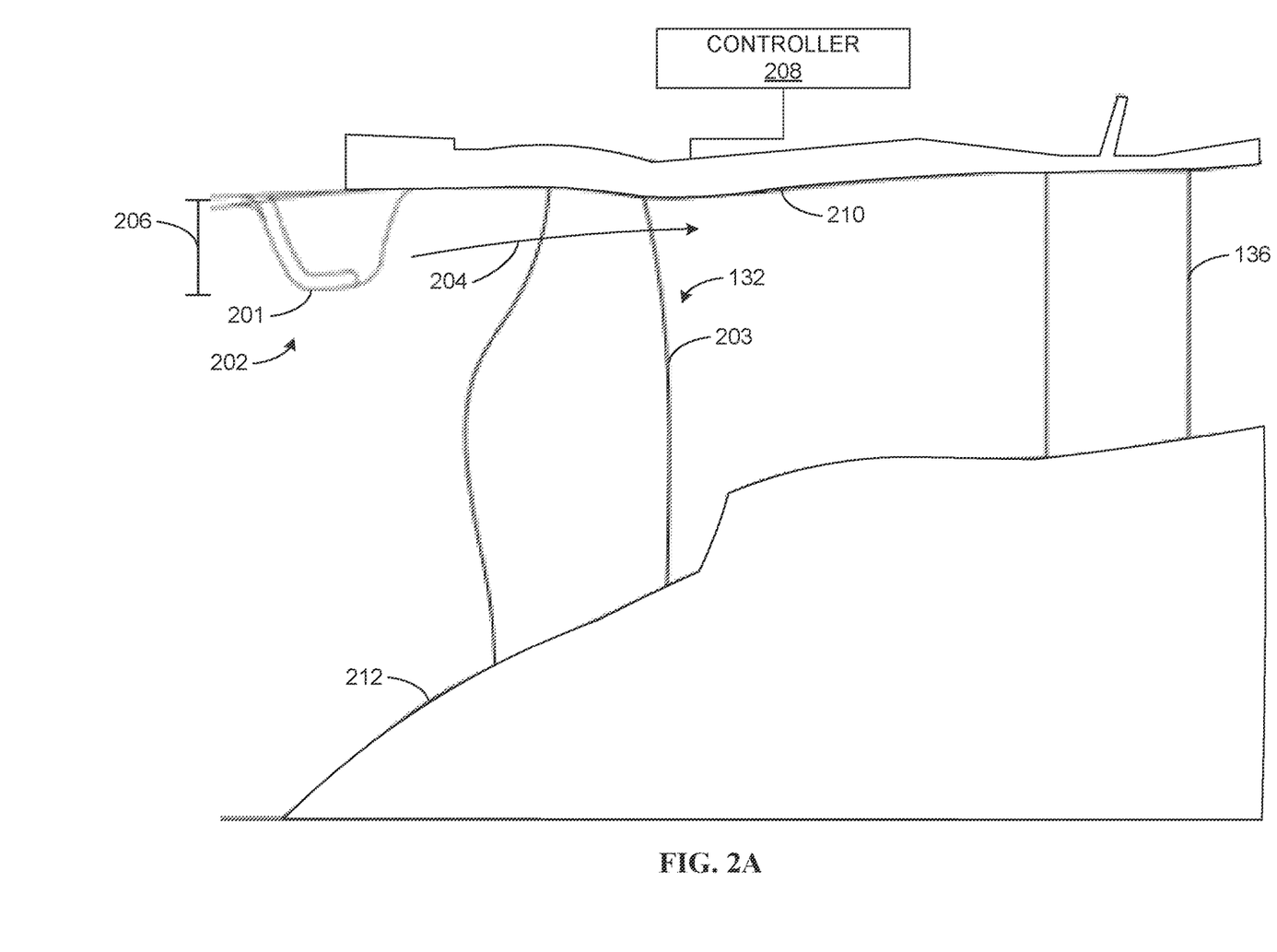
FIG. 2A illustrates a cross-sectional view of the inlet and fan section of FIG. 1 illustrating a cantilevered airfoil.
Figure 2B:
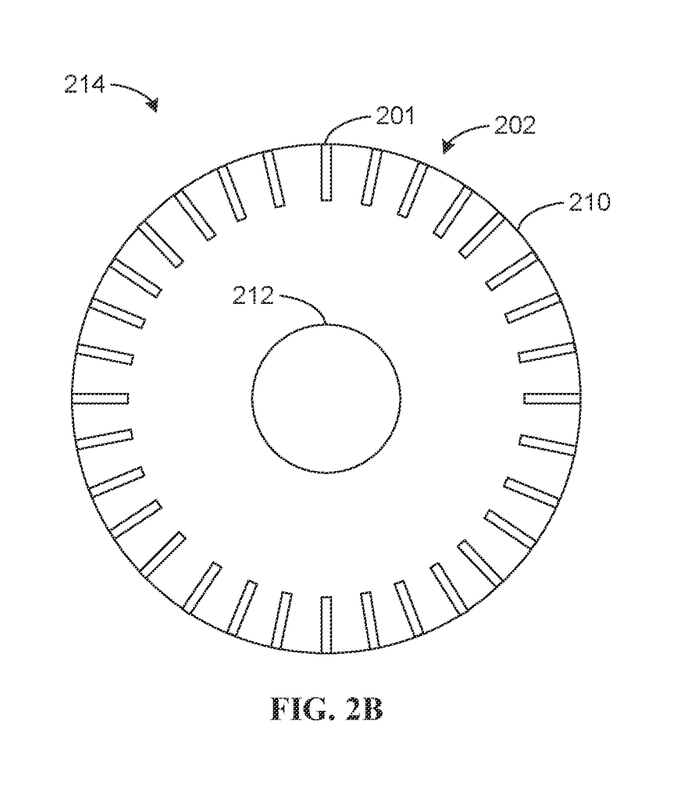
FIG. 2B is a cross-sectional simplified illustration of the inlet illustrating the cantilevered airfoils of FIG. 2A.
Figure 2C:
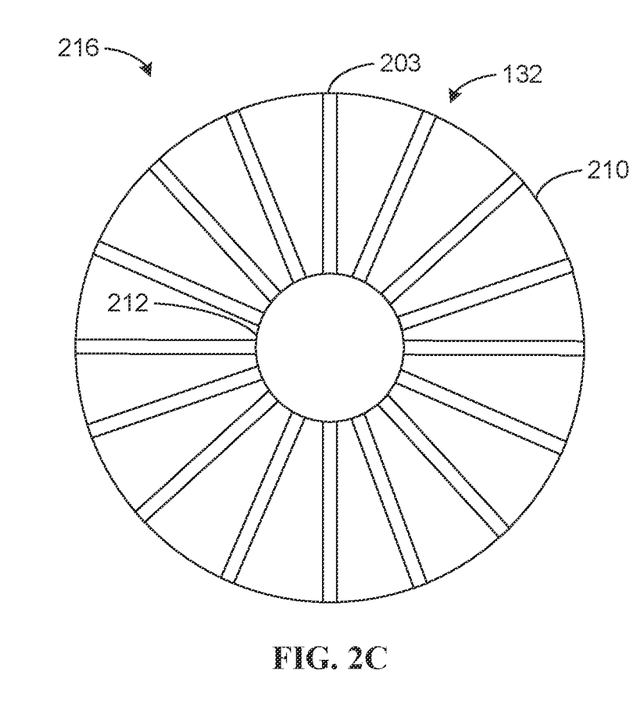
FIG. 2C is a cross-sectional simplified illustration of the fan section of FIG. 2A.

FIGS. 2A-2C illustrate cross-sectional views of the inlet 110 and fan section 106 of FIG. 1 illustrating an example cantilevered airfoil 201 of a plurality of airfoils 202. In the illustrated example of FIG. 2A, the cantilevered airfoil 201 redirects an example airflow 204 onto a fan blade 203 of the plurality of fan blades 132. In the illustrated example of FIG. 2A, the cantilevered airfoil 201 has an example span 206 and is regulated by an example controller 208. In the illustrated example of FIG. 1, the flow path of the turbofan 100 has an example outer diameter 210 and an example inner diameter 212. While the examples of FIGS. 2A-7 are described with reference to the turbofan 100, the examples disclosed herein can be applied to any suitable type of turbo machinery.

The airfoils 202 include features (e.g., composed of shaped-memory alloys, etc.) that enable the airfoils to assume different curvature profiles (e.g., different cambers, etc.) based on the temperature of those features and/or the airfoils 202. In the illustrated example of FIGS. 2A and 2B, the airfoils 202 is coupled to an internal surface of the flow path of the inlet 110 at the outer diameter 210. In the illustrated example of FIG. 2A, the airfoil 201 is coupled beneath an acoustic panel (not illustrated) of the turbofan 100. In the illustrated example of FIG. 2A, the airfoils 202 are cantilevered (e.g., only coupled to the gas turbine inner dimension, etc.). In other examples, the tip of the airfoils 202 can be coupled to a ring that is coupled to the other airfoils in the same engine stage as the airfoils 202.

The controller 208 controls the shape of the airfoils 202 to regulate the incidence angle onto fan blades 132. For example, the controller 208 can control the temperature of the airfoil 202. Because the airfoils 202 assume different curvature profiles (e.g., different cambers, etc.) based on temperature, the controller 208 can control the shape and/or curvature of the airfoils 202. The function of the controller 208 is described below in conjunction with FIG. 5. An example implementation of the controller 208 is described below in conjunction with FIG. 6. The controller 208 can be implemented by a controller associated with the turbofan 100 and/or a controller associated with an aircraft coupled to the turbofan 100.

In the illustrated example of FIGS. 2A-2C, the span 206 of the airfoil 201 is 15% of the span of the fan blade 203. In other examples, the span 206 of the airfoil 201 can have any other suitable relationship to the fan blade 203 (e.g., between 10% and 30% of the span of the fan blade 203, etc.). In the illustrated example of FIG. 2A, the tip of the fan blade 203 is faster than the root of the fan blade 203 (e.g., at near-supersonic speeds, etc.). In such examples, the incidence angle of the airflow 204 onto the tip portion of the fan blades 132 is of greater significance to the efficacy of the gas turbine engine than the incidence angle of the airflow 204 near the root. Accordingly, the airfoil 201 can improve the efficiency of the fan section 106 without extending the entire span of the fan blades 132.

FIGS. 2B and 2C are simplified front view cross-sections of the turbofan 100 of FIG. 2A. FIG. 2B is a simplified front cross-section 214 that illustrates the airfoils 202. FIG. 2C is a simplified front cross-section 216 that illustrates the fan blades 132 and is a view downstream of the cross-section 214. The features of the turbofan 100 downstream of the cross-section 214, 216 are not illustrated in FIGS. 2B and 2C for clarity purposes. In the illustrated example of FIGS. 2B and 2C, there are 32 of the airfoils 202 and 16 of the fan blades 132 (e.g., twice as many airfoils 202 than the fan blades 132. In other examples, the turbofan 100 can include any suitable quantity of the airfoils 202 and fan blades 132. In some examples, there can be a comparatively greater number of the airfoils 202 when compared to fan blades 132 (e.g., three times as many airfoils 202, a same amount etc.).

Figure 3:
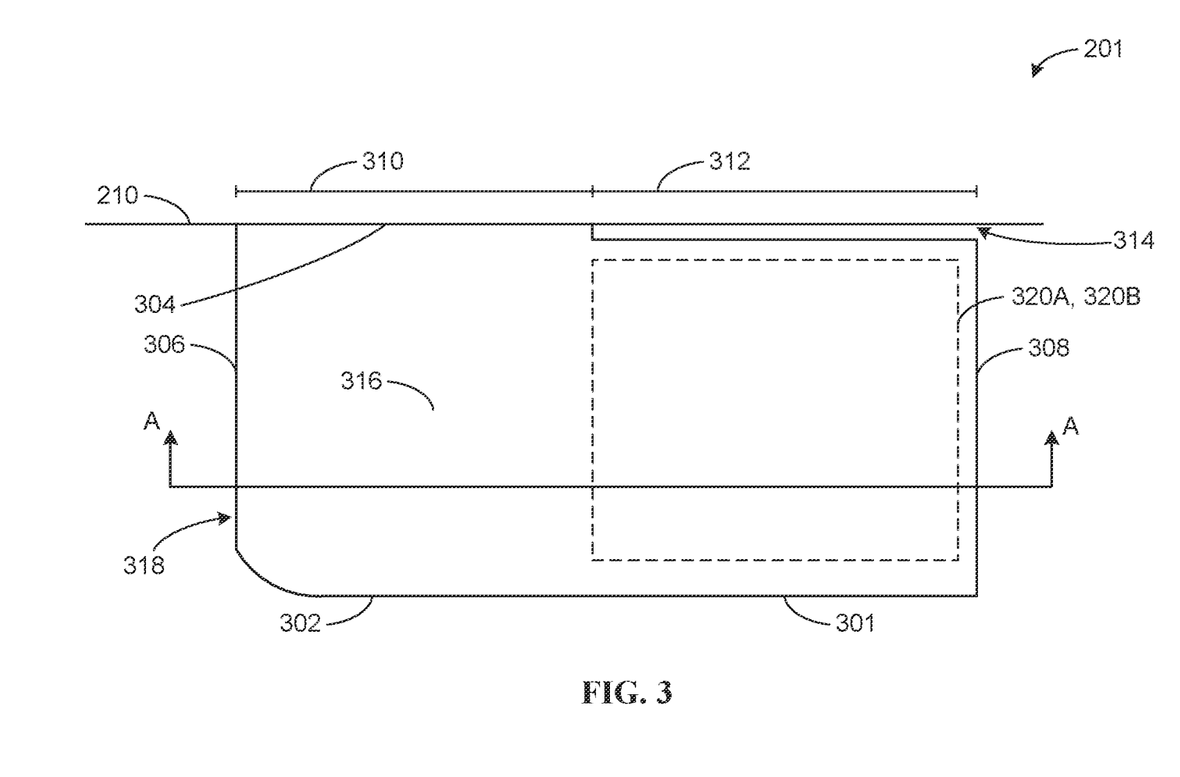
FIG. 3 illustrates the cantilevered airfoil of FIG. 2A.

FIG. 3 illustrates the cantilevered airfoil 201 of FIG. 2A. In the illustrated example of FIG. 3, the cantilevered airfoil 201 includes an airfoil body 301, an example tip 302, an example root 304, an example leading edge 306, and an example trailing edge 308. In the illustrated example of FIG. 3, the cantilevered airfoil 201 includes an example first chordwise portion 310 coupled to the casing and an example second chordwise portion 312 spaced from the casing by an example gap 314. In the illustrated example of FIG. 3, the cantilevered airfoil 201 includes an example first face 316 (e.g., a suction face, etc.) and an example second face 318 (e.g., a pressure face, etc.), opposite the first face 316. In the illustrated example of FIG. 3, the cantilevered airfoil 201 includes an example first insert 320A an example second insert 320B.

In the illustrated example of FIG. 3, the illustration of the shape of the airfoil 201 is simplified. In other examples, the airfoil 201 and/or the airfoil body 301 can other more complicated shaped as appropriate for the turbofan 100 (FIG. 1). In the illustrated example of FIGS. 3, the tip 302 of the airfoil 201 is cantilevered and is not coupled to any other component of the turbofan 100. In other examples, the tip 302 can be coupled to a bearing ring that is configured to be coupled to other airfoils aligned with the airfoil 201.

In the illustrated example of FIG. 3, the chordwise portions 310, 312 are equal (or substantially equal) in chordwise length. In other examples, the chordwise portions 310, 312 can have differing lengths (e.g., the first chordwise portion 310 can be longer than the second chordwise portion 312, the first chordwise portion 310 can be smaller than the second chordwise portion 312, etc.).

The inserts 320A, 320B are coupled to features (e.g., recessed portions, etc.) the airfoil body 301 to form the airfoil 201. In the illustrated example of FIG. 3, the inserts 320A, 320B are shape-memory alloys (SMA) that enable the shape of the inserts 320A, 320B to be controlled based on their temperature. The inserts 320A, 320B can be composed of any suitable SMA (e.g., a copper-aluminum-nickel alloy, a nickel-titanium alloy, an iron-magnesium-tin alloy, a copper-zinc-aluminum alloy, a copper-aluminum-nickel alloy, etc.). In the illustrated example, the inserts 320A, 320B are rectangular prisms. In other examples, the inserts 320A, 320B can have any other suitable shape(s) (e.g., shaped like the airfoil 201, cylindrical, polygonal prisms, etc.). In the illustrated example of FIG. 3, the inserts 320A, 320B are generally adjacent to the trailing edge 308. In other examples, the inserts 320A, 320B can be located at any other suitable location in the airfoil 201.

In the illustrated example of FIG. 3, the inserts 320A, 320B are generally aligned with the example second chordwise portion 312. For example, the inserts 320A, 320B are configured to change in shape based on the temperature of the inserts 320A, 320B. In some examples, the inserts 320A, 320B bend the airfoil body 301 based on their shape. In the illustrated example of FIG. 3, the gap 314 enables the entire span of the second chordwise portion 312 to bend in response to the bending of the inserts 320A, 320B. In the illustrated example of FIG. 3, the airfoil 201 includes the two inserts 320A, 320B coupled on the first face 316 and the second face 318 (see FIGS. 4A and 4B), respectively. In other examples, the airfoil 201 can include any number of inserts (e.g., 1 insert, 3 inserts, etc.).

Figure 4A:
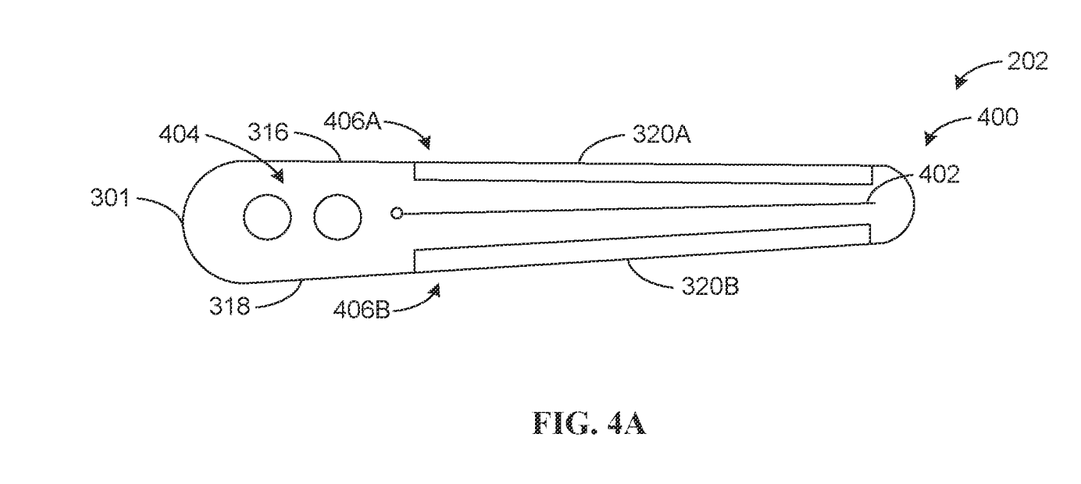
FIG. 4A is top views of the cantilevered airfoil of FIG. 3 in a first curvature profile

FIG. 4A is top view of the cantilevered airfoil 201 in an example first curvature profile 400. In the illustrated example of FIG. 4A, the cantilevered airfoil 201 includes example internal temperature-regulating features 402 and an example mounting features 404. In the illustrated example of FIG. 4A, the cantilevered airfoil 201 includes an example first recessed portion 406A and an example second recessed portion 406B.

In the illustrated example of FIG. 4A, the inserts 320A, 320B are coupled within the respective ones of the recessed portions 406A, 406B. In the illustrated example of FIG. 4A, the recessed portions 406A, 406B are formed in respective ones of the faces 316, 318. In some examples, the recessed portions 406A, 406B are formed during the manufacturing of the airfoil body 301. In other examples, the recessed portions 406A, 406B can be formed after the manufacturing of the airfoil body 301 by any suitable means.

The internal temperature-regulating features 402 enable the controller 208 (FIG. 2A) to control the shape of the airfoil 201 by modulating the temperature of the of the inserts 320A, 320B. In some examples, the internal temperature-regulating features 402 can include air channels to received bleed air from another part of the turbofan 100 (e.g., the compressor, the turbine, etc.). In such examples, the controller 208 can, via a valve or similar flow regulating device, control the amount of comparatively hot bleed air that flows into the airfoil 201. In some such examples, the greater the flow of the bleed air through the internal temperature-regulating features 402, the greater the temperature of the inserts 320A, 320B. Additionally or alternatively, the internal temperature-regulating features 402 can include electrical heating elements. In some such examples, the internal temperature-regulating features 402 can include electric coils. In such examples, the controller 208 can, via the current applied through the internal temperature-regulating features 402, regulate the temperature of the inserts 320A, 320B. As such, the controller 208 can control the temperature of the inserts 320A, 320B, and, thus, the shape of the inserts 320A, 320B via the internal temperature-regulating features 402.

The example mounting features 404 enables the airfoil 201 to be mounted to the casing and/or another suitable component of the turbofan 100. In the illustrated examples of FIGS. 4A and 4B, the example mounting features 404 includes two holes to receive corresponding fasteners. Additionally or alternatively, the mounting features 404 can include any other suitable feature(s) that enable the airfoil 201 to be coupled to the turbofan 100 (e.g., one or weld surfaces, one or more fasteners, one or more chemical adhesives, etc.).

Figure 4B:
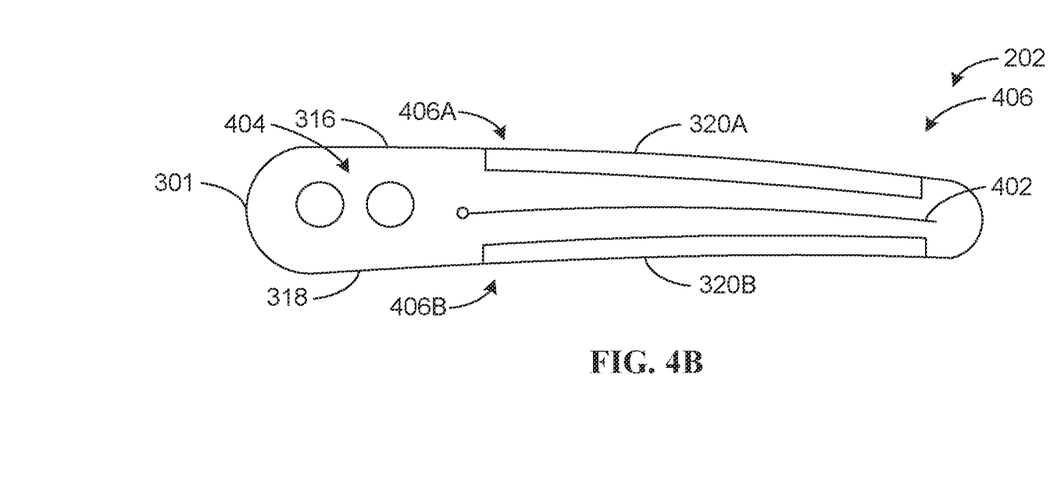
FIG. 4B is top views of the cantilevered airfoil of FIG. 3 in a second curvature profile.

FIG. 4B is top view of the cantilevered airfoil 201 in an example second curvature profile 407. In the illustrated example of FIG. 4B, the cantilevered airfoil 201 includes example internal temperature-regulating features 402 of FIG. 4A and an example mounting features 404 of FIG. 4A.

The curvature profiles 400, 407 are predefined and determined during the manufacturing of the airfoil 201 and/or the inserts 320A, 320B. For example, the inserts 320A, 320B can be cold deformed such that the inserts 320A, 320B have a tendency to revert to an undeformed curvature profile when heated. Accordingly, depending on the initial processing of the inserts 320A, 320B, the curvature profile of the inserts 320A, 320B, and the airfoil 201 can be regulated by changing the temperature of the airfoil 201. Generally, the comparatively greater camber of the second curvature profile 407 when compared to the camber of the first curvature profile 400 makes the second curvature profile 407 more suitable for higher engine speeds than the first curvature profile 400. For example, the greater camber of the second curvature profile 407 induces a greater pre-swirl to the airflow 204, which increases the efficiency of the fan section at higher engine speeds.

In the illustrated example of FIG. 4B, the controller 208, via the internal temperature-regulating features 402, has caused the cantilevered airfoil 201 to assume the second curvature profile 407, which causes the incidence angle onto the fan blades to change. By changing the curvature of the airfoil 201 via the internal temperature-regulating features 402, the incidence angle of the airflow 204 onto the fan blades 132 can be controlled to ensure the continued efficiency of the fan section 106 regardless of engine speed and inlet conditions. For example, the curvature of the airfoil 201 can be controlled to change the properties of the airflow 204 (e.g., the direction of the airflow 204, etc.) to help ensure an efficient angle of incidence of the airflow 204 onto the fan blades 132. In some such examples, efficient angles of incidence for the fan blades 132 can vary based on the condition of the turbofan 100 (e.g., the current engine speed, the current flight phase, etc.), and the initial properties of the airflow 204 can vary based on inlet conditions. As such, the curvature profiles determined by the controller 208 can be based on the flight phase, inlet condition and/or engine condition. While only two curvature profiles 400, 407 are depicted in the illustrated examples of FIGS. 4A and 4B, the examples disclosed herein can be applied to control the curvature profile of the airfoil into many other positions.

Figure 5:
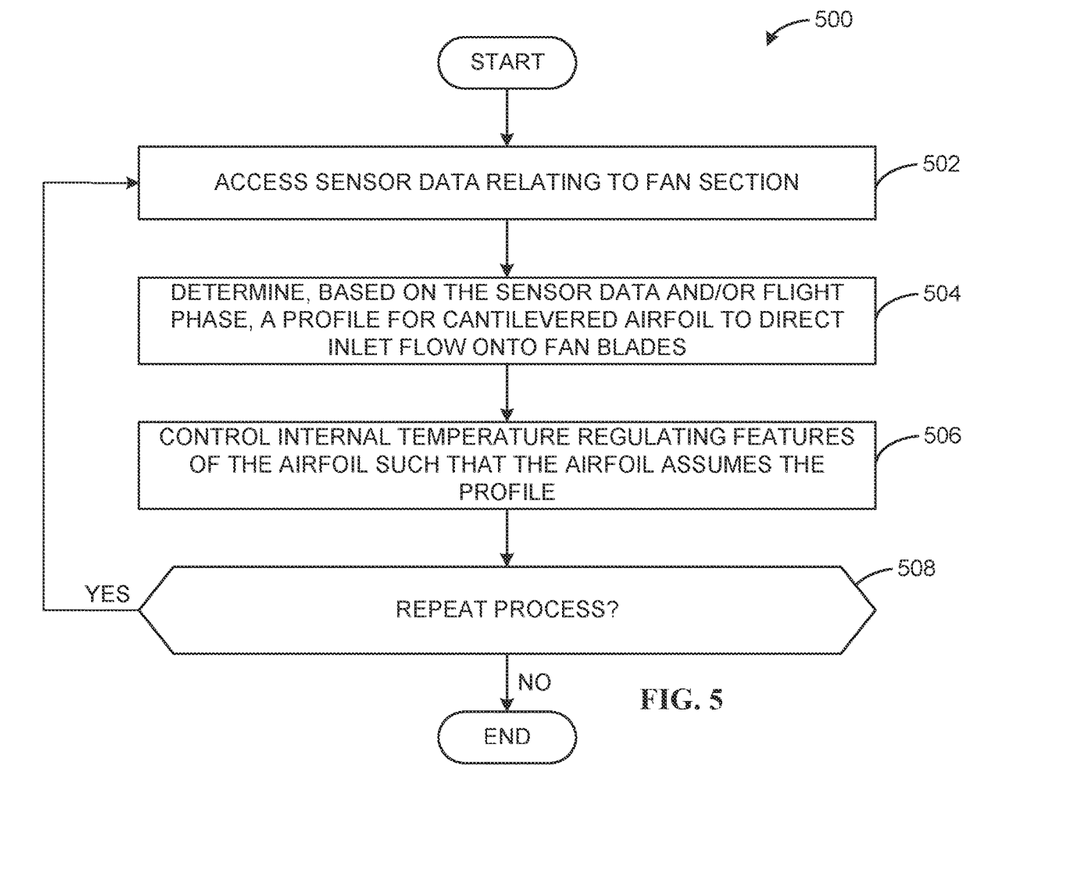
FIG. 5 is a flow diagram illustrating an operation that may be used to manufacture the airfoils of FIGS. 2A-2C, 3, and 4A-4B.

A flowchart representative of example hardware logic circuitry, machine readable instructions, hardware implemented state machines, and/or any combination thereof for implementing the controller 208 of FIG. 2A is shown in FIG. 5. The machine readable instructions may be one or more executable programs or portion(s) of an executable program for execution by processor circuitry, such as the processor circuitry 612 shown in the example processor platform 600 discussed below in connection with FIG. 6. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 5, many other methods of implementing the example controller 208 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIG. 5 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

FIG. 5 is a flowchart representative of example machine readable instructions and/or example operation(s) 500 that may be executed and/or instantiated by processor platform 600 (FIG. 6) to adjust the curvature profile (e.g., camber, etc.) of the airfoil 201. The machine-readable instructions and/or operations 500 of FIG. 5 begin at block 502, the controller 208 accesses sensor data relating to the fan section 106. For example, the controller 208 can receive sensor data relating to the inlet conditions (e.g., air velocity, air temperature, humidity, etc.), engine condition (e.g., engine power, engine speed, etc.), condition of the airfoil 202 (e.g., a temperature sensor, a displacement sensor, etc.) and/or any other suitable engine parameters.

At block 504, the controller 208 determines based on the sensor data, a curvature profile (e.g., camber profile, camber, etc.) for the cantilever to direct the flow onto the fan blades. For example, the controller 208 can determine an efficient incidence angle for the fan blade to receive flow and determine a curvature profile for the airfoil 201. In some examples, the controller 208 can generate a curative profile with a camber proportional to the engine's rotational speed (e.g., curvature profiles with higher cambers corresponding to higher engine rotations per minute (rpm), curvature profiles with lower cambers corresponding to lower engine rpm, etc.). In some examples, the controller 208 can determine the curvature profile based on a current flight phase of the turbofan 100 (e.g., takeoff, cruise, idle, etc.). In some such examples, the controller 208 can retrieve the curvature profile associated with flight phrase from a memory associated with controller 208 (e.g., the volatile memory 614 of FIG. 6, the non-volatile memory 616 of FIG. 6, the mass storage 628 of FIG. 6, the local memory 613, etc.). In some examples, the controller 208 can determine the curvature profile using a look-up with flight phase and/or the accessed data as inputs.

At block 506, the controller 208 controls the internal temperature-regulating features 402 of the airfoil 201 such that the airfoil 201 assumes the desired profile. For example, the controller 208 can control the flow of bleed air through the airfoil 201 to regulate the temperature of the airfoil 201, causing the inserts 320A, 320B to assume the desired shape. In other examples, the controller 208 can control the shape of the airfoil 201 and/or the inserts 320A, 320B by electric heating elements (e.g., if the internal temperature-regulating features 402 are electric coils, etc.).

At block 508, the controller 208 determines if the operations 500 is to be repeated. For example, the controller 208 can periodically repeat the operations 500 (e.g., every 10 seconds, every 1 minute, etc.). In other examples, the controller 208 can repeat the operation based on a detected change in engine condition and/or inlet condition. If the operations 500 are to be repeated, the operations 500 returns to block 502. If the operations 500 are not to be repeated, the operations 500 ends.

Figure 6:
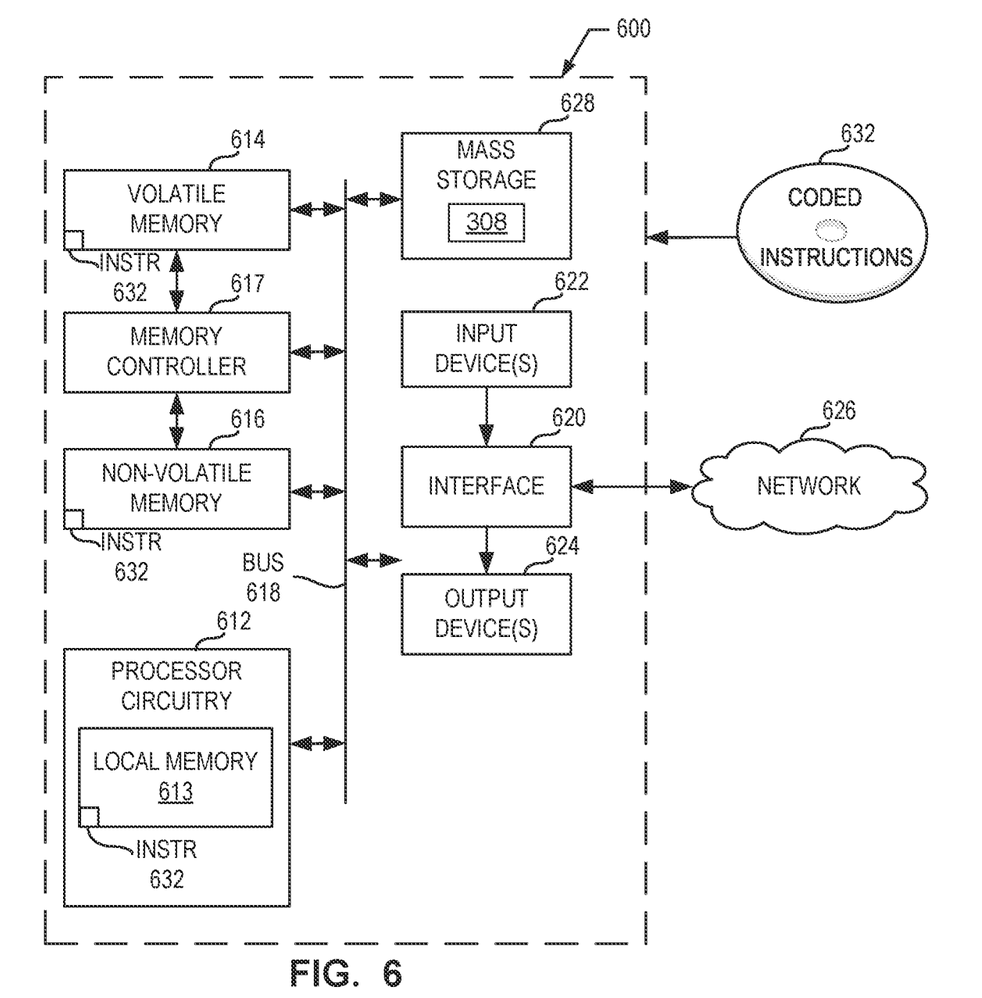
FIG. 6 is a flowchart representative of example machine readable instructions that may be executed by example processor circuitry to implement the controller of FIG. 2A.

FIG. 6 is a block diagram of an example processor platform 600 structured to execute and/or instantiate the machine readable instructions and/or operations of FIG. 5 to implement the controller 208 of FIG. 2A. The processor platform 600 can be, for example, a processor associated with the engine, a processor associated with an onboard aircraft system, etc.

The processor platform 600 of the illustrated example includes processor circuitry 612. The processor circuitry 612 of the illustrated example is hardware. For example, the processor circuitry 612 can be implemented by one or more integrated circuits, logic circuits, FPGAs microprocessors, CPUs, GPUs, DSPs, and/or microcontrollers from any desired family or manufacturer. The processor circuitry 612 may be implemented by one or more semiconductor based (e.g., silicon based) devices.

The processor circuitry 612 of the illustrated example includes a local memory 613 (e.g., a cache, registers, etc.). The processor circuitry 612 of the illustrated example is in communication with a main memory including a volatile memory 614 and a non-volatile memory 616 by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617.

The processor platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 622 are connected to the interface circuitry 620. The input device(s) 622 permit(s) a user to enter data and/or commands into the processor circuitry 612. The input device(s) 622 can be implemented by, for example, one or more user interface devices (e.g., an audio sensor, a microphone, a camera (still or video), a keyboard, a button, a mouse, a touchscreen, a track-pad, a trackball, an isopoint device, and/or a voice recognition system and/or one or more sensors (e.g., a temperature sensor, a pressure sensor, a flow velocity sensor, a rotations per minute (rpm) sensor, a displacement sensor, a linear variable differential transformer (LVDT) sensor, etc.).

One or more output devices 624 are also connected to the interface circuitry 620 of the illustrated example. The output devices 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 600 of the illustrated example also includes one or more mass storage devices 628 to store software and/or data. Examples of such mass storage devices 628 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 632, which may be implemented by the machine readable instructions of FIG. 5, may be stored in the mass storage device 628, in the volatile memory 614, in the non-volatile memory 616, and/or on a removable non-transitory computer readable storage medium such as a CD or DVD.

Figure 7:
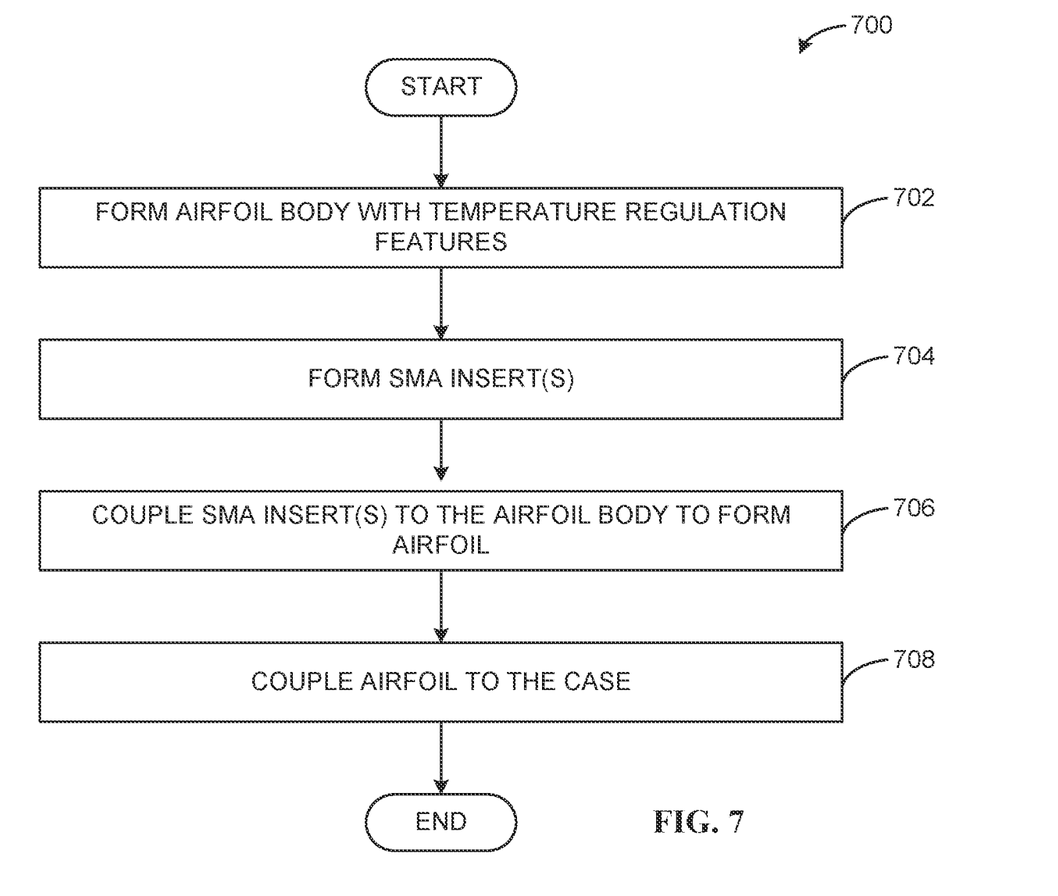
FIG. 7 of an example processing platform including processor circuitry structured to execute the example machine readable instructions of FIG. 6 to implement controller of FIG. 2A.

FIG. 7 is a flow diagram illustrating operations 700 that may be used to manufacture the airfoil 201 of FIGS. 2A-2C, 3, and 4A-4B. At block 702, the airfoil body 301 is formed with the internal temperature-regulating features 402. In some examples, the airfoil body 301 can be formed with portions to receive inserts 320A, 320B. In other examples, the airfoil body 301 can be machined to have recessed portions to receive the inserts 320A, 320B. In some examples, the airfoil body 301 can be formed via additive manufacturing and/or machining. At block 704, the inserts 320A, 320B are formed. For example, the inserts 320A, 320B can be formed via machining, additive manufacturing, casting, etc. In some examples, the inserts 320A, 320B can be processed (e.g., cold deformed, etc.) such that the inserts have predefined curvature profiles over a temperature range.

At block 706, the inserts 320A, 320B are coupled to the airfoil body 301 to form the airfoil 201. For example, the inserts 320A, 320B can be coupled to via one or more adhesives, one or more fasteners, one or press-fits, one or more shrink fits. At block 708, the airfoil 201 is coupled to the casing 108. For example, the airfoil 201 can be coupled to the casing 108 via the mounting features 404. In other examples, the airfoil can be coupled to the case via any other suitable means.

Cantilevered airfoils are disclosed herein. The examples disclosed herein improve the efficiency of gas turbine engine by ensuring efficient incidence angles regardless of inlet conditions. Cantilevered airfoils disclosed herein are significantly lighter than conventional stators due to the lack of articulation hardware and the partial span of the cantilevered airfoils.

Further aspects of the present disclosure are provided by the subject matter of the following clauses:

Example 1 includes an airfoil comprising an airfoil body including a first face, a second face, a first recessed portion formed in the first face, and internal temperature-regulating feature, and a first insert disposed within the first recessed portion, the first insert causing the airfoil body to assume a first predefined curvature profile at a first temperature, the first insert causing the airfoil body to assume a second predefined curvature profile at a second temperature.

Example 2 includes the airfoil of any preceding clause, wherein the airfoil body includes a second recessed portion formed in the second face, and further including a second insert disposed within the second recessed portion, the second insert shaping the airfoil body to the first predefined curvature profile at the first temperature, the second insert shaping the airfoil body to the second predefined curvature profile at the second temperature.

Example 3 includes the airfoil of any preceding clause, wherein at least one of the first insert or the second insert is composed of a shared-memory alloy.

Example 4 includes the airfoil of any preceding clause, wherein the internal temperature-regulating feature are channels for bleed air.

Example 5 includes the airfoil of any preceding clause, wherein the internal temperature-regulating feature are electric heating elements.

Example 6 includes the airfoil of any preceding clause, further including a tip, and a base including a first portion to be coupled to an outer diameter of an inlet casing of a gas turbine engine, and a second portion to form a gap between the airfoil body and the inlet casing.

Example 7 includes the airfoil of any preceding clause, further including a leading edge adjacent to the first portion, and a trailing edge adjacent to the second portion.

Example 8 includes the airfoil of any preceding clause, wherein the first recessed portion is chordwise aligned with the second portion.

Example 9 includes the airfoil of any preceding clause, wherein the tip is to be cantilevered relative to the inlet casing.

Example 10 includes a gas turbine engine comprising an inlet, a plurality of fan blades including a first fan blade, and a plurality of airfoils to be coupled to an outer diameter of the inlet, the plurality of airfoils upstream of the fan blade, the plurality of airfoils including a first airfoil, the first airfoil including an airfoil body including a first face, a second face, a first recessed portion formed in the first face, and internal temperature-regulating feature, and a first insert disposed within the first recessed portion, the first insert causing the airfoil body to assume a first predefined curvature profile at a first temperature, the first insert causing the airfoil body to assume a second predefined curvature profile at a second temperature.

Example 11 includes the gas turbine engine of any preceding clause, wherein the airfoil body is between 10% and 30% of a span of the first fan blade.

Example 12 includes the gas turbine engine of any preceding clause, further including a controller, the controller to cause the first airfoil to, via the internal temperature-regulating features, assume at least one of the first predefined curvature profile and the second predefined curvature profile to control an incidence angle of an airflow to a tip of the first fan blade.

Example 13 includes the gas turbine engine of any preceding clause, wherein the plurality of the airfoils includes a first quantity of the airfoils and the plurality of the fan blades includes a second quantity of the airfoils, the first quantity being at least twice the second quantity.

Example 14 includes the gas turbine engine of any preceding clause, wherein the airfoil body includes a second recessed portion formed in the second face, and further including a second insert disposed within the second recessed portion, the second insert causing the airfoil body to assume the first predefined curvature profile at the first temperature, the second insert causing the airfoil body to assume the second predefined curvature profile at the second temperature.

Example 15 includes the gas turbine engine of any preceding clause, wherein at least one of the first insert or the second insert is composed of a shaped-memory alloy.

Example 16 includes the gas turbine engine of any preceding clause, wherein the internal temperature-regulating feature are channels for bleed air.

Example 17 includes the gas turbine engine of any preceding clause, wherein the internal temperature-regulating feature are electric heating elements.

Example 18 includes the gas turbine engine of any preceding clause, wherein the first airfoil further includes a tip, and a base including a first portion to be coupled to an inner diameter of the inlet, and a second portion to form a gap between the airfoil body and the inlet casing.

Example 19 includes the gas turbine engine of any preceding clause, wherein the first recessed portion is chordwise aligned with the second portion.

Example 20 includes the gas turbine engine of any preceding clause, wherein the tip is to be cantilevered relative to the inlet casing.

Example 21 includes a method comprising accessing sensor data relating to a fan section of a gas turbine engine, determining, based on at least one of the sensor data or a flight phase of the gas turbine engine, a curvature profile of a cantilevered airfoil upstream of the fan section, the curvature profile of the cantilevered airfoil to direct a flow into the fan section, and controlling a temperature of the cantilevered airfoil, the temperature causing the cantilevered airfoil to assume the curvature profile.

Example 22 includes a method comprising forming an airfoil body including a temperature regulation feature and a recessed portion, forming a smart metal alloy (SMA) insert, coupling the SMA insert within the recessed portion, and disposing the airfoil body to an outer diameter of an inlet of a gas turbine engine.

The following claims are hereby incorporated into this Detailed Description by this reference, with each claim standing on its own as a separate embodiment of the present disclosure.

What is claimed is:

1. An airfoil comprising:
    a trailing edge;
    a tip;
    an internal temperature-regulating feature;
    a single piece airfoil body including a first face having a first recessed portion formed therein;
    a base including:
        a first portion to be coupled to an inner diameter of an inlet casing of a gas turbine engine; and
        a second portion to form a gap between the single piece airfoil body and the inlet casing; and
    a first insert disposed within the first recessed portion, the first insert causing the single piece airfoil body to assume a first predefined curvature profile at a first temperature, the first insert causing the single piece airfoil body to assume a second predefined curvature profile at a second temperature, the first insert having a first end adjacent to the first portion and a second end adjacent to the trailing edge, the first insert having a chordwise length greater than or equal to 50% of a chord length of the airfoil.

2. The airfoil of claim 1, wherein the single piece airfoil body includes a second recessed portion formed in a second face of the single piece airfoil body, and further including a second insert disposed within the second recessed portion, the second insert shaping the single piece airfoil body to the first predefined curvature profile at the first temperature, the second insert shaping the single piece airfoil body to the second predefined curvature profile at the second temperature.

3. The airfoil of claim 2, wherein at least one of the first insert or the second insert is composed of a shaped-memory alloy.

4. The airfoil of claim 1, wherein the internal temperature-regulating feature is a channel for bleed air.

5. The airfoil of claim 1, wherein the internal temperature-regulating feature is an electric heating element.

6. The airfoil of claim 1, further including a leading edge adjacent to the first portion and wherein the trailing edge is adjacent to the second portion.

7. The airfoil of claim 1, wherein the first recessed portion is chordwise aligned with the second portion.

8. The airfoil of claim 1, wherein the tip is to be cantilevered relative to the inlet casing.

9. A gas turbine engine comprising:
    an inlet;
    a plurality of fan blades including a first fan blade; and
    a plurality of airfoils to be coupled to an outer diameter of the inlet, the plurality of airfoils upstream of the first fan blade, the plurality of airfoils including a first airfoil, the first airfoil including:
        a trailing edge;
        a tip;
        an internal temperature-regulating feature;
        a single piece airfoil body including a first face having a first recessed portion formed therein;
        a base including:
            a first portion coupled to an inner diameter of the inlet; and
            a second portion positioned to form a gap between the single piece airfoil body and the inlet; and
        a first insert disposed within the first recessed portion, the first insert causing the single piece airfoil body to assume a first predefined curvature profile at a first temperature, the first insert causing the single piece airfoil body to assume a second predefined curvature profile at a second temperature, the first insert having a first end adjacent to the first portion and a second end adjacent to the trailing edge, the first insert having a chordwise length greater than or equal to 50% of a chord length of the first airfoil.

10. The gas turbine engine of claim 9, wherein the single piece airfoil body is between 10% and 30% of a span of the first fan blade.

11. The gas turbine engine of claim 9, further including a controller, the controller to cause the first airfoil to, via the internal temperature-regulating feature, assume at least one of the first predefined curvature profile and the second predefined curvature profile to control an incidence angle of an airflow to the tip of the first fan blade.

12. The gas turbine engine of claim 9, wherein the plurality of airfoils includes a first quantity of airfoils and the plurality of fan blades includes a second quantity of airfoils, the first quantity being at least twice the second quantity.

13. The gas turbine engine of claim 9, wherein the single piece airfoil body includes a second recessed portion formed in a second face of the single piece airfoil body, and further including a second insert disposed within the second recessed portion, the second insert causing the single piece airfoil body to assume the first predefined curvature profile at the first temperature, the second insert causing the single piece airfoil body to assume the second predefined curvature profile at the second temperature.

14. The gas turbine engine of claim 13, wherein at least one of the first insert or the second insert is composed of a shaped-memory alloy.

15. The gas turbine engine of claim 9, wherein the internal temperature-regulating feature is a channel for bleed air.

16. The gas turbine engine of claim 9, wherein the internal temperature-regulating feature is an electric heating element.

17. The gas turbine engine of claim 9, wherein the first recessed portion is chordwise aligned with the second portion.

18. The gas turbine engine of claim 9, wherein the tip is to be cantilevered relative to the inlet casing.

* * * * *